US008265340B2

(12) United States Patent
Lee et al.

(10) Patent No.: US 8,265,340 B2
(45) Date of Patent: Sep. 11, 2012

(54) SYSTEM AND METHOD FOR DISPLAYING A PRODUCT CATALOG

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 444 days.

(21) Appl. No.: 12/692,510

(22) Filed: Jan. 22, 2010

(65) Prior Publication Data
US 2011/0096959 A1 Apr. 28, 2011

(30) Foreign Application Priority Data
Oct. 22, 2009 (CN) .......................... 2009 1 0308654

(51) Int. Cl.
*G06K 9/00* (2006.01)
(52) U.S. Cl. ........................................ 382/103; 348/169
(58) Field of Classification Search .................. 382/100, 382/103, 106, 107, 115, 117, 118, 181, 190, 382/195, 199, 203, 205, 206; 348/135, 143, 348/169–172
See application file for complete search history.

(56) References Cited

U.S. PATENT DOCUMENTS

| | | | |
|---|---|---|---|
| 6,246,779 B1 * | 6/2001 | Fukui et al. | 382/103 |
| 7,272,243 B2 * | 9/2007 | Toyama | 382/103 |
| 7,747,040 B2 * | 6/2010 | Toyama | 382/103 |
| 7,809,162 B2 * | 10/2010 | Steinberg et al. | 382/103 |
| 8,077,216 B2 * | 12/2011 | Ishihara | 348/222.1 |
| 8,115,877 B2 * | 2/2012 | Blatchley et al. | 348/836 |
| 2008/0199049 A1 * | 8/2008 | Daly | 382/107 |
| 2010/0262294 A1 * | 10/2010 | Lai et al. | 700/275 |

* cited by examiner

*Primary Examiner* — Anand Bhatnagar
(74) *Attorney, Agent, or Firm* — Altis Law Group, Inc.

(57) ABSTRACT

A system and method for displaying a product catalog obtains images of a user captured by an image obtaining device, locates a face from each of the images. The system and method further determines a movement direction, a movement speed, and a movement angle of the user's face, and rotates a product catalog with the movement direction, the movement speed, and the movement angle of the user's face.

16 Claims, 4 Drawing Sheets

SYSTEM AND METHOD FOR DISPLAYING A PRODUCT CATALOG

BACKGROUND

1. Technical Field

Embodiments of the present disclosure relate to product display technology, and particularly to a system and a method for displaying a product catalog.

2. Description of Related Art

Currently, product catalogs are often displayed on Web pages statically. A status of a product catalog cannot change according to a movement of a user's face. Therefore, a prompt and efficient method for displaying the product catalog is desired.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
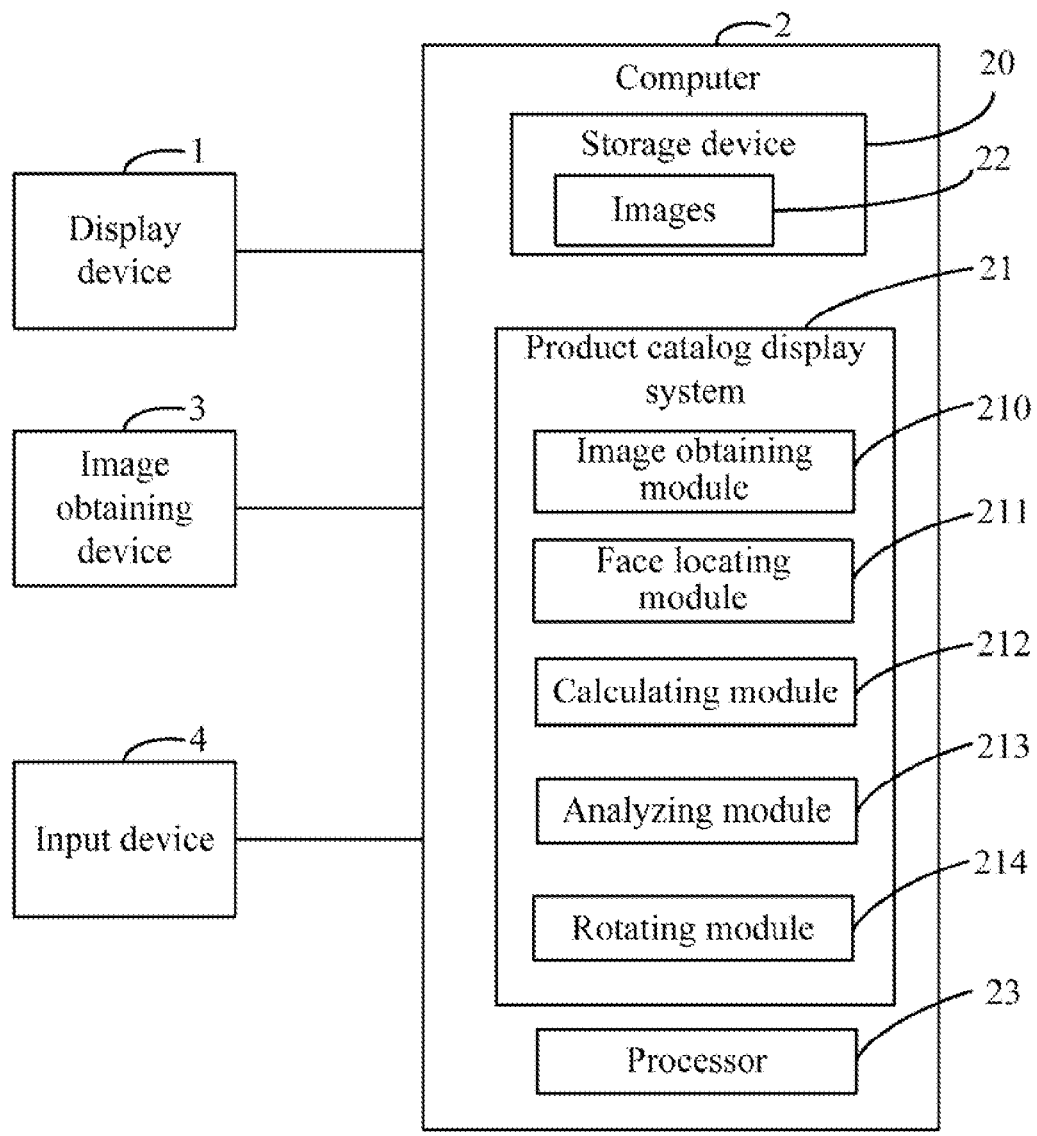
FIG. 1 is a block diagram of one embodiment of a computer comprising a product catalog display system for displaying a product catalog.

FIG. 1 is a block diagram of one embodiment of a computer 2 comprising a product catalog display system 21. In one embodiment, the product catalog system 21 may be used to rotate a product catalog according to a movement of a user's face. A detailed description will be given in the following paragraphs.

In one embodiment, the computer 2 is electronically connected to a display device 1, an image obtaining device 3, and an input device 4. Depending on the embodiment, the display device 1 may be a liquid crystal display (LCD) or a cathode ray tube (CRT) display, for example.

The computer 2 further includes a storage device 20 for storing information, such as images 22 captured by the image obtaining device 3. In one embodiment, the image obtaining device 3 may be an Internet Protocol (IP) camera, and the image obtaining device 3 captures thirty images per second (30 frames/s). That is to say, a capture interval of the image obtaining device 3 is about 0.03 seconds.

The input device 4 may be used to manually select a product catalog displayed on the display device 1. In one embodiment, the input device 4 may be a keyboard.

In one embodiment, the product catalog display system 21 includes an image obtaining module 210, a face locating module 211, a calculating module 212, an analyzing module 213, and a rotating module 214. In one embodiment, the modules 210-214 comprise one or more computerized instructions that are stored in the storage device 20. A processor 23 of the computer 2 executes the computerized instructions to implement one or more operations of the computer 2.

The image obtaining module 210 obtains a current image and a previous image of a user captured by the image obtaining device 3 from the storage device 20.

The face locating module 211 locates a first face from the current image and a second face from the previous image. In one embodiment, the face locating module 211 locates a face using an skin color model in YCbCr space or a face template matching method. This embodiment takes YCbCr space as an example. In YCbCr, the Y is the brightness (luma), Cb is blue minus luma (B−Y), and Cr is red minus luma (R−Y). One example of an equation for finding facial skin is as follows.

$$P(x, y) = \begin{cases} 1, & \text{if } [135 \le Cr(x, y) \le 156] \cap [108 \le Cb(x, y) \le 123] \\ 0, & \text{otherwise} \end{cases}$$

In the equation, "P" stands for a pixel in the image, and "(x, y)" stands for a coordinate of "P". In one embodiment, a value of $Cr(x, y)$ ranges from 135 to 156, a value of $Cb(x, y)$ ranges from 108 to 123. In other embodiments, the values of the $Cr(x, y)$ and the $Cb(x, y)$ may be any other suitable ranges. If a value of the $P(x, y)$ is 1, the face locating module 211 judges that an examined area in the image is facial skin. If a value of the $P(x, y)$ is 0, the face locating module 211 judges that an examined area in the image is not facial skin. If the examined area is facial skin, then the examined area in the image is set to white, otherwise, the examined area is set to black.

The calculating module 212 calculates a first smallest rectangle framing the first face and a second smallest rectangle framing the second face.

The calculating module 212 calculates a scalar value between coordinates of the first smallest rectangle and the second smallest rectangle. In one embodiment, the analyzing module 213 calculates a scalar value between coordinates of a center point of the first smallest rectangle and a center point of the second smallest rectangle.

The analyzing module 213 determines a movement direction, a movement speed, and a movement angle of the user's face according to the scalar value. A detailed description is as follows.

Figure 2B:
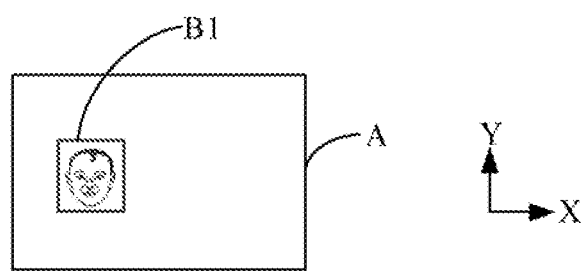
FIG. 2A-2E are schematic diagrams of one embodiment of determining a movement direction of a user's face.
Figure 2D:
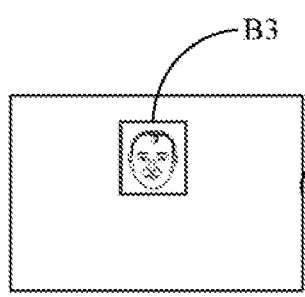
Figure 2A:
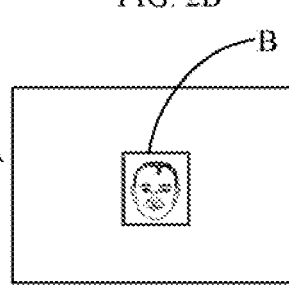
Figure 2E:
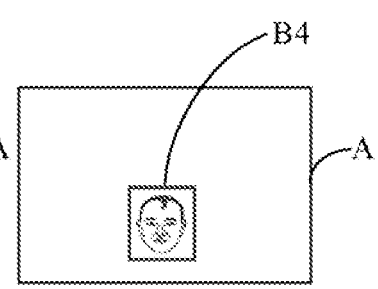
Figure 2C:
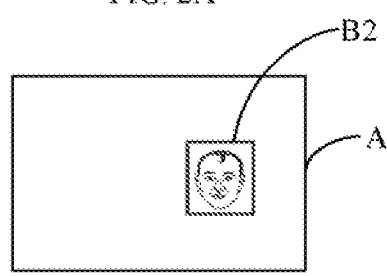

FIG. 2A-2E are schematic diagrams of one embodiment of determining the movement direction of the user's face. FIG. 2A is a previous image of the user captured by the image obtaining device 3, where "A" stands for a capture area of the image obtaining device, "B" stands for the second smallest rectangle.

The analyzing module 213 determines the movement direction of the user's face is leftward, if a scalar value between X-axis coordinates of the center point of the first smallest rectangle and the center point of the second smallest rectangle is less than zero. For example, refers to FIG. 2B, "B1" stands for the first smallest rectangle framing the first face of the current image, supposing the coordinates of the center point of "B" are (x0, y0), the coordinates of the center point of "B1" are (x1, y0). If (x1−x0)<0, the analyzing module 213 determines the movement direction of the user's face is leftward.

The analyzing module 213 determines the movement direction of the user's face is rightward, if the scalar value between the X-axis coordinates of the center point of the first smallest rectangle and the center point of the second smallest rectangle is greater than zero. For example, refers to FIG. 2C, "B2" stands for the first smallest rectangle framing the first face of the current image, supposing the coordinates of the center point of "B" are (x0, y0), the coordinates of the center point of "B2" are (x2, y0). If (x2−x0)>0, the analyzing module 213 determines the movement direction of the user's face is rightward.

The analyzing module 213 determines the movement direction of the user's face is upward, if a scalar value between Y-axis coordinates of the center point of the first smallest rectangle and the center point of the second smallest rectangle is greater than zero. For example, refers to FIG. 2D, "B3" stands for the first smallest rectangle framing the first face of the current image, supposing the coordinates of the center point of "B" are (x0, y0), the coordinates of the center point of "B3" are (x0, y1). If (y1−y0)>0, the analyzing module 213 determines the movement direction of the user's face is upward.

The analyzing module 213 determines the movement direction of the user's face is downward, if the scalar value between the Y-axis coordinates of the center point of the first smallest rectangle and the center point of the second smallest rectangle is less than zero. For example, refers to FIG. 2E, "B4" stands for the first smallest rectangle framing the first face of the current image, supposing the coordinates of the center point of "B" are (x0, y0), the coordinates of the center point of "B4" are (x0, y2). If (y2−y0)<0, the analyzing module 213 determines the movement direction of the user's face is downward.

Figure 3:
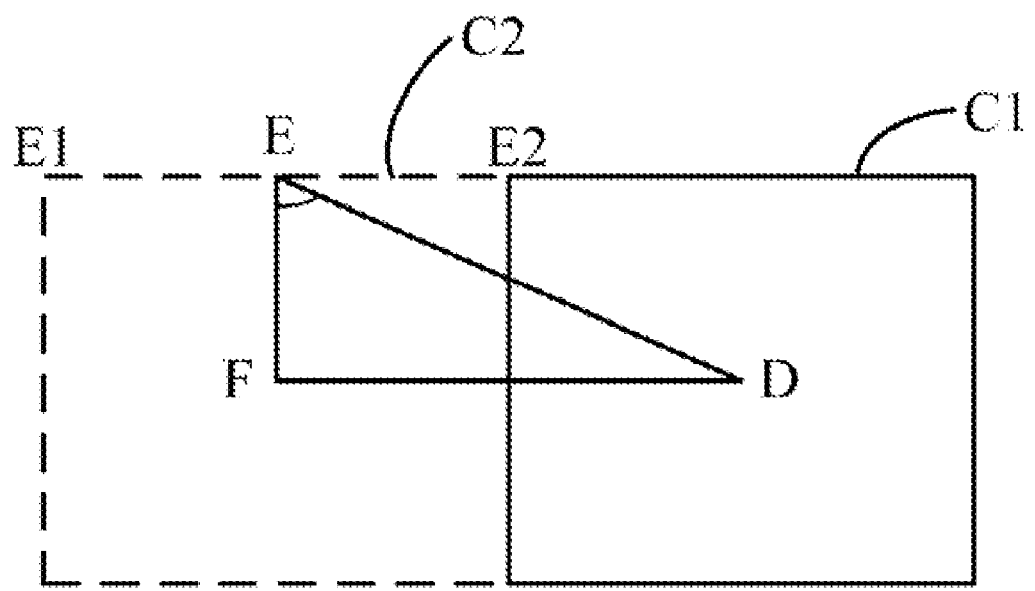
FIG. 3 is a schematic diagram of one embodiment of obtaining a movement speed and a movement angle of the user's face.

FIG. 3 is a schematic diagram of one embodiment of determining the movement speed and the movement angle of the user's face. The movement speed of the user's face is defined as the scalar value divided by the capture interval of the image obtaining device 3. In one embodiment, the capture interval of the image obtaining device 3 is 0.03 second. Refers to FIG. 3, supposing the movement direction of the user's face is leftward, "C1" stands for the second smallest rectangle framing the second face of the previous image, "D" stands for the center point of "C1", "C2" stands for the first smallest rectangle framing the first face of the current image, "F" stands for the center point of "C2", "E" stands for a center point of a line segment "E1E2". Thus, the movement speed (e.g., 5 cm/s) of the user's face is defined as a length of the line segment "E1E2" (e.g., |E1E2|=0.15 cm) divided by the capture interval (e.g., 0.03 s) of the image obtaining device 3, the movement angle of the user's face is defined as ∠DEF (e.g., ∠DEF=60 degrees).

The rotating module 214 rotates a product catalog on a Webpage according to the movement direction, the movement speed, and the movement angle of the user's face. A detailed description is as follows.

In one embodiment, the rotating module 214 rotates the product catalog rightward with the movement speed (e.g., 5 cm/s) and the movement angle (e.g., 60 degrees) of the user's face, if the movement direction of the user's face is leftward. The rotating module 214 rotates the product catalog leftward with the movement speed and the movement angle of the user's face, if the movement direction of the user's face is rightward. The rotating module 214 rotates the product catalog downward with the movement speed and the movement angle of the user's face, if the movement direction of the user's face is upward. The rotating module 214 rotates the product catalog upward with the movement speed and the movement angle of the user's face, if the movement direction of the user's face is downward.

In other embodiment, the rotating module 214 is further operable to zoom in the product catalog if an area of the first smallest rectangle is greater than an area of the second smallest rectangle (i.e., the user's face moves closer to the image obtaining device 3), or zoom out the product catalog if an area of the first smallest rectangle is less than an area of the second smallest rectangle (i.e., the user's face moves away from the image obtaining device 3).

Figure 4:
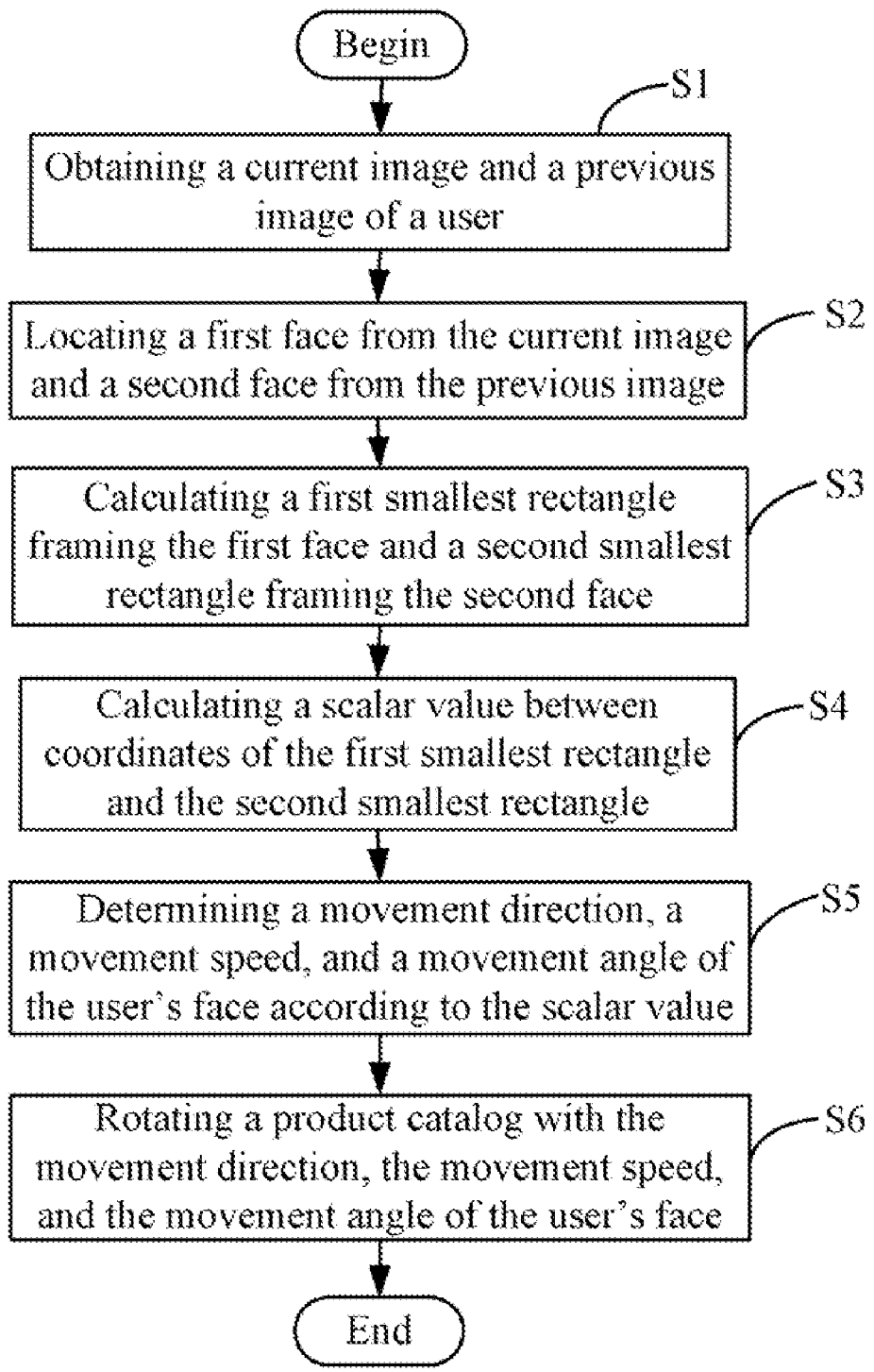
FIG. 4 is a flowchart of one embodiment of a method for displaying a product catalog.

FIG. 4 is a flowchart of one embodiment of a method for displaying a product catalog.

In block S1, the image obtaining module 210 obtains a current image and a previous image of a user captured by the image obtaining device 3 from the storage device 20.

In block S2, the face locating module 211 locates a first face from the current image and a second face from the previous image. A detailed description refers to paragraphs [0014]-[0015].

In block S3, the calculating module 212 calculates a first smallest rectangle framing the first face and a second smallest rectangle framing the second face.

In block S4, the calculating module 212 calculates a scalar value between coordinates of the first smallest rectangle and the second smallest rectangle. In one embodiment, the analyzing module 213 calculates a scalar value between coordinates of a center point of the first smallest rectangle and a center point of the second smallest rectangle.

In block S5, the analyzing module 213 determines a movement direction, a movement speed, and a movement angle of the user's face according to the scalar value. A detailed description is given in paragraphs [0019]-[0024].

In block S6, the rotating module 214 rotates a product catalog on a Webpage according to the movement direction, the movement speed, and the movement angle of the user's face. A detailed description is given in paragraph [0026].

In other embodiment, the method further comprises: zooming in the product catalog if an area of the first smallest rectangle is greater than an area of the second smallest rectangle (i.e., the user's face moves closer to the image obtaining device 3), or zooming out the product catalog if an area of the first smallest rectangle is less than an area of the second smallest rectangle (i.e., the user's face moves away from the image obtaining device 3).

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented product catalog display method, comprising:
    obtaining a current image and a previous image of a user captured by an image obtaining device from a storage device;
    locating a first face from the current image and a second face from the previous image;
    calculating a first smallest rectangle framing the first face and a second smallest rectangle framing the second face;
    calculating a scalar value between coordinates of the first smallest rectangle and the second smallest rectangle;
    determining a movement direction, a movement speed, and a movement angle of the user's face according to the scalar value; and
    rotating a product catalog according to the movement direction, the movement speed, and the movement angle of the user's face.

2. The method according to claim 1, wherein calculating a scalar value between coordinates of the first smallest rectangle and the second smallest rectangle comprises:
    calculating a scalar value between coordinates of a center point of the first smallest rectangle and a center point of the second smallest rectangle.

3. The method according to claim 2, wherein determining a movement direction of the user's face according to the scalar value comprises:
    determining that the movement direction of the user's face is leftward if a scalar value between X-axis coordinates of the center point of the first smallest rectangle and the center point of the second smallest rectangle is less than zero;
    determining that the movement direction of the user's face is rightward if a scalar value between the X-axis coordinates of the center point of the first smallest rectangle and the center point of the second smallest rectangle is greater than zero;
    determining that the movement direction of the user's face is upward if a scalar value between Y-axis coordinates of the center point of the first smallest rectangle and the center point of the second smallest rectangle is greater than zero; and
    determining that the movement direction of the user's face is downward if a scalar value between the Y-axis coordinates of the center point of the first smallest rectangle and the center point of the second smallest rectangle is less than zero.

4. The method according to claim 3, wherein rotating a product catalog according to the movement direction, the movement speed, and the movement angle of the user's face comprises:
    rotating the product catalog rightward with the movement speed and the movement angle of the user's face if the movement direction of the user's face is leftward;
    rotating the product catalog leftward with the movement speed and the movement angle of the user's face if the movement direction of the user's face is rightward;
    rotating the product catalog downward with the movement speed and the movement angle of the user's face if the movement direction of the user's face is upward; and
    rotating the product catalog upward with the movement speed and the movement angle of the user's face if the movement direction of the user's face is downward.

5. The method according to claim 1, further comprising:
    zooming in the product catalog if an area of the first smallest rectangle is greater than an area of the second smallest rectangle; or
    zooming out the product catalog if an area of the first smallest rectangle is less than an area of the second smallest rectangle.

6. A non-transitory computer readable medium having stored thereon instructions that, when executed by a processor of a computer, cause the processor to perform a method for displaying a product catalog, the method comprising:
    obtaining a current image and a previous image of a user captured by an image obtaining device from a storage device;
    locating a first face from the current image and a second face from the previous image;
    calculating a first smallest rectangle framing the first face and a second smallest rectangle framing the second face;
    calculating a scalar value between coordinates of the first smallest rectangle and the second smallest rectangle;
    determining a movement direction, a movement speed, and a movement angle of the user's face according to the scalar value; and
    rotating a product catalog according to the movement direction, the movement speed, and the movement angle of the user's face.

7. The non-transitory computer readable medium according to claim 6, wherein calculating a scalar value between coordinates of the first smallest rectangle and the second smallest rectangle comprises:
    calculating a scalar value between coordinates of a center point of the first smallest rectangle and a center point of the second smallest rectangle.

8. The non-transitory computer readable medium according to claim 7, wherein obtaining a movement direction of the user's face according to the scalar value comprises:
    determining that the movement direction of the user's face is leftward if a scalar value between X-axis coordinates of the center point of the first smallest rectangle and the center point of the second smallest rectangle is less than zero;
    determining that the movement direction of the user's face is rightward if a scalar value between the X-axis coordinates of the center point of the first smallest rectangle and the center point of the second smallest rectangle is greater than zero;
    determining that the movement direction of the user's face is upward if a scalar value between Y-axis coordinates of the center point of the first smallest rectangle and the center point of the second smallest rectangle is greater than zero; and
    determining that the movement direction of the user's face is downward if a scalar value between the Y-axis coordinates of the center point of the first smallest rectangle and the center point of the second smallest rectangle is less than zero.

9. The non-transitory computer readable medium according to claim 8, wherein rotating a product catalog according to the movement direction, the movement speed, and the movement angle of the user's face comprises:
    rotating the product catalog rightward with the movement speed and the movement angle of the user's face if the movement direction of the user's face is leftward;
    rotating the product catalog leftward with the movement speed and the movement angle of the user's face if the movement direction of the user's face is rightward;
    rotating the product catalog downward with the movement speed and the movement angle of the user's face if the movement direction of the user's face is upward; and
    rotating the product catalog upward with the movement speed and the movement angle of the user's face if the movement direction of the user's face is downward.

10. The non-transitory computer readable medium according to claim 6, further comprising:
    zooming in the product catalog if an area of the first smallest rectangle is greater than an area of the second smallest rectangle; or
    zooming out the product catalog if an area of the first smallest rectangle is less than an area of the second smallest rectangle.

11. The non-transitory computer readable medium according to claim 6, wherein the medium is selected from the group consisting of a hard disk drive, a compact disc, a digital video disc, and a tape drive.

12. A computing system for displaying a product catalog, comprising:
- a storage device for storing images captured by an image obtaining device;
- an image obtaining module operable to obtain a current image and a previous image of a user from the storage device;
- a face locating module operable to locate a first face from the current image and a second face from the previous image;
- a calculating module operable to calculate a first smallest rectangle framing the first face and a second smallest rectangle framing the second face;
- the calculating module further operable to calculate a scalar value between coordinates of the first smallest rectangle and the second smallest rectangle;
- an analyzing module operable to obtain a movement direction, a movement speed, and a movement angle of the user's face according to the scalar value; and
- a rotating module operable to rotate a product catalog according to the movement direction, the movement speed, and the movement angle of the user's face.

13. The system according to claim 12, wherein the calculating module calculates a scalar value between coordinates of the first smallest rectangle and the second smallest rectangle by:
- calculating a scalar value between coordinates of a center point of the first smallest rectangle and a center point of the second smallest rectangle.

14. The system according to claim 13, wherein the analyzing module obtains a movement direction of the user's face according to the scalar value by:
- determining that the movement direction of the user's face is leftward if a scalar value between X-axis coordinates of the center point of the first smallest rectangle and the center point of the second smallest rectangle is less than zero;
- determining that the movement direction of the user's face is rightward if a scalar value between the X-axis coordinates of the center point of the first smallest rectangle and the center point of the second smallest rectangle is greater than zero;
- determining that the movement direction of the user's face is upward if a scalar value between Y-axis coordinates of the center point of the first smallest rectangle and the center point of the second smallest rectangle is greater than zero; and
- determining that the movement direction of the user's face is downward if a scalar value between the Y-axis coordinates of the center point of the first smallest rectangle and the center point of the second smallest rectangle is less than zero.

15. The system according to claim 14, wherein the rotating module rotates a product catalog according to the movement direction, the movement speed, and the movement angle of the user's face by:
- rotating the product catalog rightward with the movement speed and the movement angle of the user's face if the movement direction of the user's face is leftward;
- rotating the product catalog leftward with the movement speed and the movement angle of the user's face if the movement direction of the user's face is rightward;
- rotating the product catalog downward with the movement speed and the movement angle of the user's face if the movement direction of the user's face is upward; and
- rotating the product catalog upward with the movement speed and the movement angle of the user's face if the movement direction of the user's face is downward.

16. The system according to claim 12, wherein the rotating module further operable to:
- zoom in the product catalog if an area of the first smallest rectangle is greater than an area of the second smallest rectangle; or
- zoom out the product catalog if an area of the first smallest rectangle is less than an area of the second smallest rectangle.

* * * * *